United States Patent [19]

Adams et al.

[11] 3,894,970

[45] July 15, 1975

[54] METHOD OF PREPARING HIGH TEMPERATURE STABLE GAMMA IRON OXIDE

[75] Inventors: Genevieve Marie Adams, San Jose; John Irving Crowley, Palo Alto; Keith Harris Larson, San Jose, all of Calif.

[73] Assignee: International Business Machines Corporation, Armonk, N.Y.

[22] Filed: Mar. 26, 1973

[21] Appl. No.: 344,803

[52] U.S. Cl. ......... 252/62.54; 252/62.6; 252/62.63; 423/265; 423/634

[51] Int. Cl.[2] ...................... H01F 1/28; C01G 49/06

[58] Field of Search ............ 252/62.54, 62.56, 62.6, 252/62.63; 423/634, 265; 117/236, 7, 234, 5

[56] References Cited

UNITED STATES PATENTS

| | | | |
|---|---|---|---|
| 3,075,919 | 1/1963 | Gruber et al. | 252/62.56 X |
| 3,272,595 | 9/1966 | Maho | 423/634 |
| 3,652,334 | 3/1972 | Abeck et al. | 252/62.56 X |

FOREIGN PATENTS OR APPLICATIONS

| | | | |
|---|---|---|---|
| 2,144,553 | 10/1972 | Germany | |
| 212,240 | 5/1968 | U.S.S.R. | 423/634 |
| 701,224 | 12/1953 | United Kingdom | 423/634 |

*Primary Examiner*—Jack Cooper
*Attorney, Agent, or Firm*—James A. Pershon

[57] ABSTRACT

A method of making a high temperature stable ferromagnetic material comprising gamma $Fe_2O_3$ and between 0.08 to 5% by weight based on weight of $Fe_2O_3$ of a cation chosen from the group having a cation size at least substantially that of $Na^+$ and less than that of $Cs^+$. Typically, the cation is chosen from the group consisting of sodium, potassium, or calcium. Magnetic and temperature stability can be achieved to temperatures in excess of 700°C before the cubic gamma magnetic brown iron oxide converts to the alpha rhombehedral red nonmagnetic iron oxide.

3 Claims, No Drawings

METHOD OF PREPARING HIGH TEMPERATURE STABLE GAMMA IRON OXIDE

FIELD OF THE INVENTION

Methods of making ferromagnetic materials in general, and iron oxide materials in particular, and structures thereof.

BACKGROUND OF THE INVENTION

Gamma and alpha iron oxide are well known in the prior art. Gamma iron oxide is brown, ferromagnetic up to its curie point, and has a cubic structure. It is widely used in magnetic coatings such as for magnetic disk storage applications. Alpha iron oxide is red, non-magnetic, and has a rhombehedral structure. Normally, the gamma phase transforms to the alpha phase upon heating to 400°C. Once the gamma iron oxide is converted to alpha iron oxide, the reaction is irreversible unless the red iron oxide is first reduced in a new series of processing steps.

For many applications it is desirable to have a higher temperature form of gamma iron oxide, to maintain its color stability and magnetic properties to temperatures in excess of 400°C. It is desirable that even though the curie point may be passed during the processing, no alpha iron oxide be formed and after treatment, the magnetic gamma form still remain. Thus, an object of this invention is to increase the temperature at which conversion of magnetic brown cubic gamma iron oxide converts to red non-magnetic rhombohedral alpha iron oxide. A further object is to maintain improved magnetic stability above the normal transition temperature of 400°C. A further object is to increase the color stability to above the normal transition temperature of 400°C. In general, the objects of this invention are to increase the magnetic and color stability to above 600°C. in a preferred embodiment, to allow more varied processing of gamma iron oxide in the manufacture of magnetic storage products while maintaining the magnetic gamma iron oxide form upon cooling to room temperature.

SUMMARY OF THE INVENTION

These and other objects of this invention are achieved by the method and structure formed herein. In one method, iron oxide particles may be mixed in a solution with a material containing between 0.08 and 5% by weight based on the weight of iron oxide of a cation chosen from the group having a cation size at least substantially that of the $Na^+$ ion and less than the $Cs^+$ ion and capable of entering the iron oxide lattice in cationic form from the solution, and evaporating the solvent from the mixture. Typically, the cation is chosen from a group consisting of calcium, sodium, and potassium, in the form of a hydroxide, phosphate, or anionic phosphate ester. In another approach, an anionic phosphate ester, for example, may be added to a fundamental solution of a ferric salt and a hydroxide to co-precipitate a basic iron hydroxide from which subsequent iron oxide is formed. The co-precipitation method also results in an improved temperature stable oxide.

This invention may best be understood in relation to the following general description.

GENERAL DESCRIPTION

Gamma iron oxide is brown in color, magnetic below its curie point, and cubic in structure. Alpha iron oxide is red in color, rhombohedral, and is non-magnetic. At approximately 400°C., the gamma iron oxide form will convert to the alpha iron oxide form. The conversion is noted both through magnetic testing and by color indication. Of course, more sophisticated techniques such as X-ray annalysis may be utilized to detect the change. For certain applications, it is desired to be able to utilize gamma iron oxide at a higher temperature than 400°C. while still retaining the gamma iron oxide structure at room temperature. For example, the gamma $Fe_2O_3$ may be mixed with a glass binder and joined to a glass substrate at temperatures up to 700°C. to form a magnetic storage medium such as a glass-magnetic particulate coated magnetic storage disk. The processing in this case requires temperatures in excess of the usual 400° transition temperature. If common $\gamma$-$Fe_2O_3$ were utilized, conversion would occur and the resulting product would simply be non-magnetic iron oxide in a glass binder on a glass substrate. Thus, a method was sought permitting such processing to occur while maintaining the magnetic stability of the iron oxide.

A common method of making iron oxide in the prior art is a method whereby a ferric salt solution, such as a ferric sulphate, ferric nitrate, ferric acetate, or a ferric chloride, is mixed with an alkaline solution such as sodium hydroxide, ammonium hydroxide, or potassium hydroxide to form a precipitate of iron hydroxide. The iron hydroxide is then dried, for example, at 100°C., and subsequently reduced with hydrogen at an elevated temperature of 350°C. for one hour or until reduction is complete as indicated by a uniform black color or by X-ray examination, for example, indicating that $Fe_3O_4$ is formed. The $Fe_3O_4$ is then oxidized in the presence of oxygen to gamma iron oxide.

We have made the unusual and unexpected discovery that the addition, for example, of an anionic phosphate ester such as Rohm and Haas H55, made by Rohm and Haas, Philadelphia, Pennsylvania, to the initial solution of the ferric salt and alkaline solution has a marked effect upon the final product. Where all the other processing steps remain the same, the final product can be reheated to a temperature of up to 700°C. while maintaining a gamma iron oxide form. The anionic phosphate ester utilized may have between 0.08 to 5% by weight based on the weight of the iron oxide to be formed, of a cation chosen from the group having a cation size at least substantially that of $Na^+$ and less than that of $Cs^+$. Typically, the cation will be sodium, potassium or calcium. The stability will vary with the amount, type, and source of cation. Above 5%, no additional increase in stability is noted.

Alternatively, already prepared particulate gamma iron oxide may be mixed with a slurry of the anionic phosphate ester above, or, for example, with a hydroxide or phosphate, or acid phosphate, of sodium, potassium or calcium, and the solution evaporated, and the resulting particles will have the same properties as the particles above made by the co-precipitation method. Again, the iron oxide should be mixed with a solution containing between 0.08 to 5% by weight based on the weight of iron oxide of a cation chosen from the group having a cation size at least substantially that of $Na^+$ ion and less than the $Cs^+$ ion and capable of entering the iron oxide lattice in cationic form from the solution. The last requirement is essential, as for example, potassium chloride and potassium sulphate will not function to form the higher temperature gamma iron oxide, while KOH, $KH_2PO_4$, $K_2HPO_4$, and $K_3PO_4$ for example, will. It is believed that the cations from the anionic phosphate ester, or from the above solutions, for example, enter the lattice and stabilize the lattice. To do this, the cations must be an appropriate size. It is also believed, but not understood, that the pH of the solution has an affect upon the ability of the cation to enter the iron oxide structure. Hence, the cations for example, will not enter from a neutral solution, but will enter from a basic solution. However, one can easily determine with the skill of one in the art whether or not the particular solution chosen will function, by simply heating a sample above 400°C. and testing for the conversion from the brown to the red magnetic to non-magnetic oxide form.

In each case, after the initial gamma iron oxide is made, the heating to the elevated temperature in utilizing which ever processing step one would use in the making of a structure incorporating the particles, reveals the presence of the high temperature stable form.

One preferred example of an anionic phosphate ester utilized in this work is Triton H55, a product of the Rohm and Haas Company, Philadelphia, Pennsylvania. Other anionic phosphate ester compounds may be utilized, having the properties previously mentioned. Samples of iron oxide as commonly used in magnetic storage mediums include MO 2530, Mo 2230 and Mo 2228 of the Pfizer Company, and Hercules iron oxide. In one examlpe, to one portion of each of these materials, approximately 1% of the Triton H55 had been added, and no additions to the control samples of the same materials. The samples were placed in aluminum cups and the solvents almost completely removed in a vacuum oven at 200°C. The residue was initially tested by heating in a muffle furnace in air at 600°c., for one hour. The residue from the samples containing the H55 was brown and magnetic. The residue from the samples that did not contain the H55 were red and non-magnetic. Further, infrared annalysis of the pair of residues from the MO 2530 were examined in the infrared region from 2.5 microns to 40 microns. The brown magnetic residue was still gamma iron oxide, on the basis of comparison with the infrared spectrum of MO 2530, while the red non-magnetic residue was alpha iron oxide on the basis of comparison with the infrared spectrum of authentic alpha iron oxide, RY 8095, again from Pfizer.

Additional experiments were performed and coating pairs pigmented with MO 2530 at 300°C, 400°C, 450°C, 650°C, 700°C, 750°C, and 800°C, heated for 15 minutes. Coatings cured at 450° to 650°C, which had contained the anionic phosphate ester, were brown and magnetic while the residues which had not contained the anionic phosphate ester were non-magnetic. In samples cured at 700°C and even more so at 750°C, the anionic phosphate ester containing sample residues were increasingly reddish in color, but both residues were still distinctly magnetic. The residues not including the anionic phosphate ester were red and non-magnetic. The test at 700°C and 750°C were made on stainless steel coupons rather than in aluminum pans. In another experiment, samples of the MO 2530 were mixed with the H55 anionic phosphate ester, in water and toluene respectively. The solutions were evaporated and the samples tested. They exceed 600°C while maintaining their structure as gamma iron oxide. Thus, there is no limitation to aqueous or nonaqueous solutions as to the initial solution utilized.

In addition, differential thermal analysis was performed on magnetic iron oxides and non-magnetic iron oxides treated in the manner of this invention. In one case, the magnetic to non-magnetic transition occurred at approximately 600°C. A pretreatment with aqueous potassium hydroxide advanced the magnetic to non-magnetic transition to 682°C. Treatment with calcium phosphate, an anionic phosphate ester, and potassium hydrogen phosphate produced progressively higher transition temperatures of 739°C, 766°C, and 791°C ± 10°C.

Similar results can be obtained by use of sodium or calcium materials in lieu of the potassium ones illustrated in the immediately above example.

Specific examples are seen in the following table.

| Example | % added ion based on wt. of iron oxide | source | transition temp. °C |
|---|---|---|---|
| 1 | .60K | H-55 | 750 |
| 2 | .22K | $K_2HPO_4$ | 600 |
| 3 | 1.1 K | $K_2HPO_4$ | 791 |
| 4 | .3 K | H-55 | 766 |
| 5 | .32K | KOH | >600 |
| 6 | 1.3 K | KOH | >600 |
| 7 | 4.5 K | $K_2HPO_4$ | >600 |
| 8 | .13K | $KH_2PO_4$ | 600 |
| 9 | 1.4 K | KOH | 682 |
| 10 | 1.6 Ca | $Ca_3(PO_4)_2$ | 739 |
| 11 | .67Na | $Na_2HPO_4$ | 760 |

The same results of temperature stability can also be obtained when utilizing an epoxy base or more generally, a synthetic resin base material. For example, an epoxy phenolic composition as well known in the prior art, loaded with gamma iron oxide particles, may be utilized in this invention. All that is necessary is that the anionic phosphate ester or the other materials be added to the synthetic resin base along with the iron oxide particles. A subsequent heat treating will result in the iron oxide particles attaining the temperature stability as previously discussed.

It is of course necessary in all cases that whatever materials are utilized within the scope of this invention, they do not chemically convert the oxide to another form of material, nor do they react with the environment in which they are utilized. From the results as illustrated in the table above, an extrapolation of the cation limitations show that it is necessary to use between 0.08 and 5% by weight of the cation, based on the weight of iron oxide, and that the cation be chosen from the group having a cation size at least substantially that of $Na^+$ and less than that of $Cs^+$. For example, lithium hydroxide and cesium hydroxide do not work and calcium hydroxide does. Thus, the cation chosen should be at the minimum of a size substantially that of the $Na^+$ ion. Based on our work, ions larger than $Na^+$ but smaller than $Cs^+$ will also work, and those skilled in the art will readily determine by the teachings above which elements in which type of solutions will function to stabilize the $\gamma$-$Fe_2O_3$ as desired.

Preferably, the particles utilized in the second method above were preprepared particles of iron oxide that are mixed with the solution containing the active cation, and are of a size approximately 15 microns or less. They may be spherical or acicular. It is preferable that if particles greater than 15 microns are to be utilized, the precipitation method be utilized.

When the preprepared gamma iron oxide particles are utilized by mixing with a solution of, for example, potassium acid phosphate, and the solution evaporated, all of this may occur at or close to room temperature. At this point the potassium may not have entered into the iron oxide lattice. It is not known at this time whether this is true or not. However, upon raising the temperature of the particles through any utilization thereof, diffusion occurs, stabilizing the particles. Thus, the particles may or may not be initially stabilized at room temperature, but the test requiring taking the particles to an elevated temperature achieves the same result, and the particles may therefore be considered as stable at room temperature just as if the processing were initially done at an elevated temperature. The particles may be reversably taken to the elevated temperature without any loss of magnetic properties or transition to the alpha iron oxide form.

While certain specific materials have been noted, equivalents will be known to those skilled in the art within the scope of this invention.

What is claimed is:

1. A method of increasing the magnetic and color temperature stability of $\gamma$-$Fe_2O_3$ comprising the steps of mixing $\gamma$-$Fe_2O_3$ with a solution chosen from the group consisting of hydroxide and phosphate of sodium, potassium and calcium containing between 0.08–5% by weight based on the weight of $Fe_2O_3$ of sodium, potassium or calcium, and evaporating the solvent from the solution of the mixture.

2. The method of claim 1 wherein the solution includes an expoxy resin.

3. The method of claim 1 wherein the solution includes a synthetic polymer resin.

* * * * *